United States Patent [19]

Jones et al.

[11] 4,002,814
[45] Jan. 11, 1977

[54] POLYMERIZATION PROCESS
[75] Inventors: Eric Jones; John Christopher Padget; Geoffrey Alan Cole, all of Runcorn, England
[73] Assignee: Imperial Chemical Industries Limited, London, England
[22] Filed: Mar. 11, 1975
[21] Appl. No.: 557,378
[30] Foreign Application Priority Data
Mar. 11, 1974 United Kingdom ............ 10686/74
[52] U.S. Cl. ............................. 526/154; 526/123; 526/350
[51] Int. Cl.² ..................... C08F 4/02; C08F 10/02
[58] Field of Search ..... 260/88.2, 94.9 B, 94.9 DA; 526/154

[56] References Cited
UNITED STATES PATENTS

| | | | |
|---|---|---|---|
| 3,432,530 | 3/1969 | Wilke | 260/94.9 B |
| 3,436,383 | 4/1969 | O'Brien et al. | 260/94.9 B |
| 3,654,254 | 4/1972 | Job et al. | 260/94.9 B |
| 3,681,317 | 8/1972 | Pioli et al. | 260/94.9 B |
| 3,840,508 | 10/1974 | Ballard et al. | 260/94.9 DA |
| 3,855,258 | 12/1974 | Pioli | 260/429.3 |

*Primary Examiner*—Edward J. Smith
*Attorney, Agent, or Firm*—Cushman, Darby & Cushman

[57] ABSTRACT

Ethylene is copolymerized with one or more mono α-olefins, especially butene and/or hexene, using as catayst a Group IVA metal hydrocarbyl compound supported on particulate alumina, the purity ratio (i.e. the molar ratio of Group IVA metal to Group I to III metal) of the said compound being at least 100/1 and, preferably, 500/1. By using these very pure compounds, especially in the case of zirconium tetrabenzyl, the incorporation of co-monomer in the copolymer product may be enhanced.

11 Claims, 1 Drawing Figure

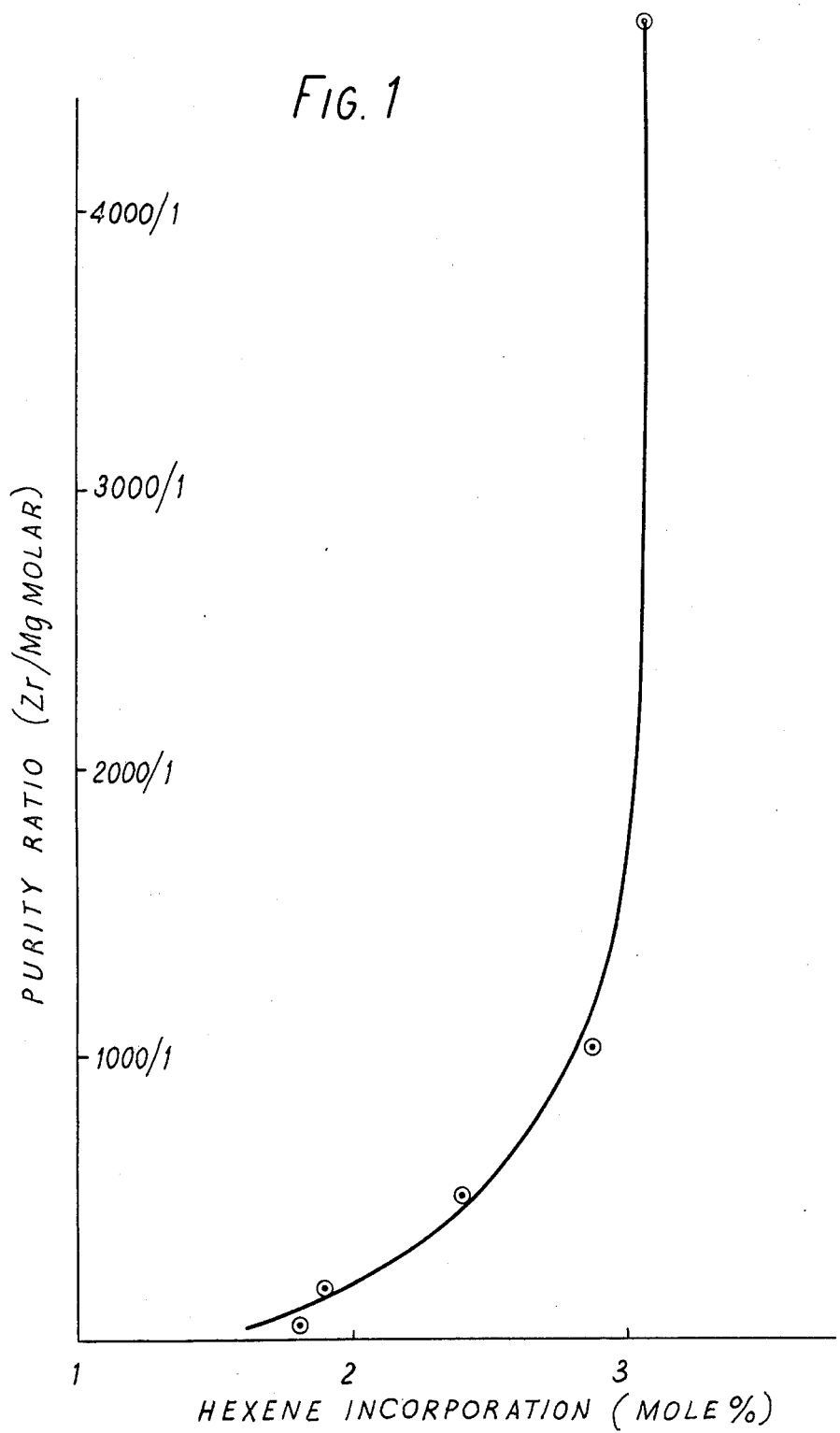

POLYMERIZATION PROCESS

This invention relates to processes for the copolymerisation of ethylene with other mono α-olefins, using as catalyst an organo-metallic compound supported on an inert inorganic material.

Such processes are described and claimed in our British Pat. No. 1,314,828, the disclosure of which is incorporated herein by reference.

We have now found that when ethylene is copolymerised with other α-olefins, especially butene-1, or hexene-1, using a catalyst comprising a Group IVA metal hydrocarbyl compound supported on particulate alumina, the degree of incorporation of the said other olefin in the product copolymer may be increased by using a Group IVA compound of very high purity.

According to the present invention, a process for the copolymerisation of ethylene with one or more other mono α-olefins in which the monomers are contacted with an initiator composition which is the product of reacting an organo-metallic compound of general formula $R_mMX_p$ with finely divided alumina which is free from absorbed water, where M is a metal of Group IVA, R is a hydrocarbyl or substituted hydrocarbyl group, and X, when present, is a singly charged anionic ligand or a monodentate neutral ligand and $m$ and $p$ are integers, $m$ having a value from 2 to 4 and $n$ having a value from 0 to 2 the sum of $m$ and $p$ being not more than 4, is characterised in that the said organo-metallic compound has a purity ratio (as hereinafter defined) of at least 100/1.

Since the organo-metallic compounds which are useful in the practice of our invention are commonly produced by reacting a Group IVA metal compound, e.g. the halide, with a hydrocarbyl compound of a Group I to III metal, the "purity" of the organo-metallic compound in the present context may be conveniently expressed in terms of the residual amount of the Group I to III metal which it contains. Thus the term "purity ratio" means the molar ratio of the Group IVA metal to the Group I to III metal in the organo-metallic compound.

When Group IVA metal organo-metallic compounds are made by the processes hitherto used, for example as described in our British Pat. No. 1,265,747 and our copending patent application number 32808/72, (published as U.S. Pat. No. 3,855,258) the purity ratios of the products are usually of the order of 50/1 or less. However, when such products are further purified to give purity ratios of at least 100/1 or preferably 500/1 and above, we have found that the use of alumina-supported initiator compositions prepared from such compounds in the copolymerisation of ethylene gives rise to the afore-mentioned enhancement of the degree of incorporation of co-monomer in the copolymer. In order to reduce the effect of minor batch to batch variations in the purity of the compounds used, it is desirable that the compounds have purity ratios of at least 1000/1.

In most commercial slurry polymerisation processes using a supported organo-metallic catalyst, the conversion of ethylene is sufficiently high to make the recovery of unreacted ethylene economically unnecessary thus enabling worthwhile simplification of the process and plant. However, when a co-monomer is introduced into the system it is often found that because of its lower reactivity towards the catalyst it must be present in the reactor in a much greater concentration than might be thought necessary to obtain the desired concentration of copolymer in the final product. This, coupled with the inherently greater price of some co-monomers, leads to increased running costs and capital charges as the gaseous effluent from the reactor must be subjected to an additional stage to recover unreacted co-monomer. Thus any modification to the copolymerisation process which obviates or reduces the need for such an additional stage is commercially attractive.

The aforementioned higher degrees of purity of the organo-metallic compounds used to prepare our supported catalysts may be obtained by any suitable method, but several convenient methods may be mentioned by way of example.

1. The organo-metallic compound may be recrystallised an appropriate number of times from a suitable ethereal or hydrocarbyl solvent, e.g. hexane or diethyl ether.
2. A hydrocarbon solution of the organo-metallic compound may be reacted partially with a little of the moisture-free alumina which it is intended to use as a support and filtered to yield a solution of the purified organo-metallic compound.
3. A hydrocarbon solution of the organo-metallic compound may be filtered through a bed containing a small amount of dried alumina and the organo-metallic compound crystallised from the filtrate.

Organo-metallic compounds of formula $R_mMX_p$ which may be used in the process of our invention include compounds of titanium, zirconium or hafnium in which the hydrocarbyl groups R, which may be the same or different, include alkyl and alkenyl groups (including π-alkenyl groups such as π-allyl) or substituted derivatives thereof. However, a preferred class of hydrocarbon groups are the substituted alkyls of general formula —$CH_2Y$, where Y may be an aromatic or polyaromatic group such as phenyl or naphthyl; or a ringsubstituted derivative such as p-methyl phenyl. Y may also comprise a group of general formula $Z(R^1)_3$, where Z represents silicon, germanium, tin or lead and $R^1$ represents a hydrocarbon group or hydrogen; preferably Z is silicon.

Examples of suitable Group IVA metal compounds include zirconium, hafnium or titanium tetrabenzyl and zirconium, hafnium or titanium tetrakis(trimethylsilylmethyl). The zirconium compounds are generally preferred.

The cayalyst compositions used in the practice of the present invention may be conveniently prepared by reacting the appropriate Group IVA metal complex with finely divided, dried alumina using one of the procedures detailed in our aforementioned British Pat. No. 1,314,828. The alumina used is preferably a γ-alumina having a particle size in the range 20–150 μm, more preferably in the range 50–100 μm and having substantially spherical particles, as described in our copending British Patent Application No. 3281/72 (equivalent to Dutch Patent Application No. 7309727).

In these procedures, a solution of the Group IVA metal compound is normally added to a slurry of the alumina in a hydrocarbon solvent at room temperature to allow the compound to react with the available —OH groups of the alumina. This usually gives rise to a catalyst composition having a concentration (or "loading") of Group IVA metal of about 0.4 to 0.5 mA per g of alumina. However, should it be desired, higher concentrations (e.g. up to 0.7 mA per g) may be achieved when using transition metal compounds having purity ratios >100/1 and preferably >500/1, by allowing the solution of Group IVA metal compound to remain in contact with the alumina for an extended period. When this is done it is convenient to shake the alumina slurry, containing sufficient of the Group IVA metal compound to give the desired loading for a certain period of time, allow the slurry to settle and then inspect the supernatant liquid. If the liquid is still coloured shaking should be continued for a further period and the supernatant liquid again inspected. This procedure should be repeated until the supernatant liquid is colourless.

An alternative procedure for producing catalyst compositions having higher loadings (which is referred to for convenience as "reverse" addition) comprises adding a slurry of alumina to a hydrocarbon solution of the Group IVA metal compound which is kept vigorously stirred during the addition. Using this last-mentioned procedure loadings up 0.9 mA of Group IVA metal per g of alumina may be produced.

Suitable co-monomers include mono $\alpha$-olefins containing three or more carbon atoms. Preferably they contain from three to 10 carbon atoms. Butene-1 and hexene-1 are particularly suitable co-monomers.

Copolymerisations according to our invention may be carried out using a wide range of conditions as mentioned in our British Pat. No. 1,314,828. However, they are most conveniently accomplished by introducing the catalyst composition, as a slurry in a suitable hydrocarbon diluent, into a stirred reaction vessel to which ethylene, co-monomer and hydrogen are continually supplied, the hydrogen being present as a chain transfer agent. It will be appreciated that the vessel, gases and diluent must be carefully purified and freed from oxygen, water, carbon monoxide, carbon dioxide, acetylene and oxygen-containing impurities which might react with and destroy the organo-metallic component of the catalyst.

Preferably these impurities are kept below 1 ppm, calculated as water, their presence being monitored to ensure that they do not exceed this limit, especially if continuous polymerisation processes are used, which commonly involve recycling of the diluent.

The diluents and gases may be purified to the required levels by any suitable means. Preferably moisture is removed by passing the gas or diluent through a molecular sieve of type 4A or 5A, and oxygen and oxygen-containing impurities may be removed by passing the diluent or gas over finely divided copper, for example "BTS" catalyst, supplied by BASF.

The level of impurity in the diluents used may be conveniently determined by titrating a known volume with a hydrocarbon solution of a coloured transition metal hydrocarbyl compound until the diluent sample shows a permanent colour due to the presence of excess titrant. A particularly suitable titrant is zirconium tetra($\pi$-allyl) which has a strong red colour. The titrant may be readily calibrated against known amounts of water and the level of impurities thus expressed as ppm of water.

Although reaction pressures up to 40 Kg/cm$^2$ may be used, it is preferred to work with a total pressure in the range 1 to 30 kg/cm$^2$, preferably 4 to 15 kg/cm$^2$, and an ethylene partial pressure in the range 1 to 20 kg/cm$^2$, preferably 1 to 10 kg/cm$^2$.

Polymerisation temperatures will depend on several factors, for example the choice of catalyst and diluent; but are generally in the range 70° to 100° C. However, since the polymerisation reaction is exothermic, it is generally necessary to remove heat from the reaction vessel, e.g. by air or water cooling, in order to regulate the temperature.

The choice of hydrogen/ethylene ratio will depend upon the desired MFI of the copolymer produced and may be readily established by means of a suitable series of experiments, as described in our copending British Patent Application No. 32809/72 (equivalent to Dutch Patent Application No. 7309727).

The copolymers produced by the process of the invention are commonly of the type known as "high density" that is having annealed densities >0.941 g/cc (see ASTM D 1248-72). However, it is possible by the use of our process to incorporate sufficient comonomer in the copolymer to obtain products having densities below 0.941 g/cc for example as low as 0.92 g/cc or even lower, that is within the range referred to as "low density."

In the copolymers of the first-mentioned type comonomer content is generally in the range 0.1 to 3 molar %, depending on the choice of monomer, while those of the second-mentioned type generally have comonomer contents of at least 2 molar %.

The invention will now be illustrated by the following Examples.

GENERAL

Purification of Gases and Diluents

Nitrogen and ethylene were deoxygenated and dried by passing them through two 2 m columns packed with freshly prepared, finely divided copper supported on alumina (B.T.S. catalyst) and type 5A molecular sieve.

Electrolytic grade hydrogen was passed through a molecular sieve dryer and a platinum catalyst deoxygenation unit.

Solvents and diluents were deoxygenated and dried by passing them through two 1.5 m columns packed with "B.T.S." catalyst and 5A molecular sieve.

Preparation of Zirconium Tetrabenzyl

Benzyl magnesium chloride (2.78 kg) as a solution in 25 liters of diethyl ether, was transferred, under nitrogen, to a reaction vessel at 0° C. Zirconium tetrachloride (1.2 kg) was added against a nitrogen purge in 300 g batches over a period of 45 minutes. The mixture was stirred for 2 hours, during which time the temperature was allowed to rise to ambient. Decalin (65 liters) was added and the mixture stirred for a further hour.

The resultant slurry was allowed to settle and the supernatant liquid was syphoned into a stainless steel filter and filtered under a slight positive pressure of nitrogen.

Ether was removed from the decalin solution by passing it over heat-exchange coils at a temperature of about 50° C while passing nitrogen through the liquid in counter-current fashion.

The decalin solution from the heat exchangers was filtered under nitrogen. The average yield of zirconium tetrabenzyl was 61%.

Analysis of products of this process showed that the molar ratios of Zr/Mg were in the range 20/1 to 50/1.

Purification of zirconium Tetrabenzyl a. Recrystallisation

An ethereal solution of zirconium tetrabenzyl was taken to dryness and the residue extracted with 3 × 500 ml portions of boiling hexane, followed by filtration through a G3 sinter containing dry Kieselguhr. After cooling overnight at −20° C, the mother liquors were decanted off and the crystalline zirconium tetrabenzyl product was dissolved in boiling hexane and again recrystallised by the same technique. The final products were found by analysis to have molar Zr/Mg ratios in the range 350/1 to 1200/1 depending on the number of recrystallisations carried out.

b. Partial Reaction with $Al_2O_3$

A solution of zirconium tetrabenzyl in decalin (1 liter) "doped" with magnesium benzyl chloride to give a Zr/Mg molar ratio of 2.15/1 and containing 0.084 mA Zr/ml was slurried with 108 g of Ketjen Grade B alumina, which had been dried at 500° C for 2 hours under nitrogen. The slurry was filtered through a G3 glass sinter. The filtrate was found to contain 0.021 mA Zr/ml and 0.00025 mA Mg/ml showing that the zirconium tetrabenzyl then had a Zr/Mg molar ratio of 84/1. This indicated that the magnesium impurities had reacted preferentially with the alumina.

c. Combination of (b) above and Recrystallisation

The ethereal filtrate from a zirconium tetrabenzyl preparation, in which 1M of magnesium benzyl chloride was employed, was filtered through 30 g of Ketjen Grade B alumina (which had been dried at 500° C for 2 hours under nitrogen) held in a G3 glass sinter. The filtrate was concentrated to about 1 liter and left at −20° C overnight. The mother liquors were decanted from the crystals which had formed in the bottom of the vessel, the yield being 39% calculated on the zirconium tetrachloride used in the initial preparation, the zirconium tetrabenzyl having a Zr/Mg molar ratio of 700/1. The mother liquors were then further concentrated and gave a further crop of crystals having a Zr/Mg molar ratio of 480/1.

Preparation of Alumina-Supported Zirconium Tetrabenzyl a. Drying Alumina

Ketjen Grade B alumina was sieved to 53–99 μm, and was dried in a rotating tube furnace at 500° C for 2 hours. Nitrogen was passed over the mouth of the tubes once the furnace has been brought to operating temperature.

The alumin was then cooled and stored under nitrogen until required b. Reaction with zirconium Tetrabenzyl Sufficient of a zirconium tetrabenzyl solution (50 g/l) in toluene) to give the desired loading was added to a slurry of dried alumina in purified hexane. The slurry was shaken vigorously at room temperature during the addition. The slurry was then allowed to settle and the colour of the supernatant liquor observed. If the liquor was still coloured the slurry was stirred for a further period and again observed. This procedure was repeated until the supernatant liquor was colourless.

Polymerisation Procedure

A one U.S. gallon stainless steel pressure vessel was prepared by heating it to 100° C and evacuating with an efficient vacuum pump. The vessel was then cooled to 60° C and 2 liters of purified hexane added. The vessel was then sparged at reaction pressure with about 200l of pure ethylene over a period of 30 mins to remove any residual moisture and oxygen, after which it was vented and the alumina-supported catalyst (containing 0.2 m A Zr) injected against a stream of ethylene. The vessel was then sealed and pressurised with 300 l/hr ethylene 100 l/hr hydrogen and 50 ml/hr of liquid butene-1. When full reaction pressure (5 kg/cm$^2$g) was reached the vessel was stirred at 1000 rpm and polymerisation commenced. Reaction was allowed to continue for 2 hours at 80° C, excess gases being bled from the vessel through a pressure control valve and gas meter so that the reaction rate could be followed, after which the gas supplies were stopped and the vessel cooled and vented. The product copolymer was then recovered by filtration at room temperature.

The copolymer was dried and weighed and its melt flow index (MFI) measured by the method of ASTM 1238-62T using a 2.16 kg weight at 190° C.

The mole % comonomer incorporation was obtained from the IR analysis of the total methyl group count of the copolymer. The total methyl count, i.e. both methyl groups which are at ends of molecules and those which are at ends of side branches, was measured using a mathematical comparison, by computer, of the absorbance curve from 1310–1430 cm$^{-1}$ with two standard polyethylenes of known methyl count. A correction was then made for those methyl groups which are ends of molecules by subtracting the methyl count of a linear polyethylene prepared using the same catalyst and having a similar MFI. The corrected methyl count was then taken to be the side group content and expressed as a mole % co-monomer incorporation.

EXAMPLE 1

The polymerisation procedure outlined above was followed using alumina-supported recrystallised zirconium tetrabenzyl having a Zr/Mg molar ratio of 350:1, the catalyst loading being 0.6 mA Zr/g of alumina. The product was 327 g of HD polyethylene copolymer having the following properties

| | |
|---|---|
| MFI | 10.5 |
| Butene-1 | 2.42 molar % |

The procedure was then repeated using the same batch of zirconium tetrabenzyl to which sufficient magnesium benzyl chloride had been added to give a Zr/Mg molar ratio of 38/1. On this occasion the incorporation of butene-1 was only 1.05 molar %.

EXAMPLE 2

The general procedure of Example 1 was followed using as catalyst a supported zirconium tetrabenzyl having a Zr/Mg ratio of 600/1 and a loading of 0.4 mA Zr/g. However, the butene-1 addition rate was increased to 200 ml/hour and hydrogen flow rate reduced to 20 l/hr. The copolymer, which was of the type generally referred to as "low density" had the following properties

| | |
|---|---|
| Density* | 0.921 g/cc |
| MFI | 12.5 |

| | |
|---|---|
| Butene-1 | 6.7 molar % |

*Determined as described in ASTM 1928/70. Method A.

EXAMPLE 3

The general procedure of Example 1 was followed, but with hexene-1 instead of butene-1 as co-monomer, dry, deoxygenated hexene-1 (1mole) being added to the polymerisation diluent prior to sparging the vessel with nitrogen. The catalyst used was a supported recrystallised zirconium tetrabenzyl having a Zr/Mg molar ratio of 700/1 and loading of 0.4 mA Zr/g $Al_2O_3$. The yield of copolymer, after 2 hours polymerisation was 271 g and had the following properties

| | |
|---|---|
| MFI | 52.6 |
| Hexene-1 | 6.7 molar % |

In a similar experiment, using an unpurified zirconium tetrabenzyl having a Zr/Mg molar ratio of 20/1, the yield of copolymer was 261 g and the hexene-1 incorporation only 3.8 molar %.

EXAMPLES 4 to 7

Preparation of Zirconium Tetrabenzyl 130 g of zirconium tetrachloride were placed in a dry, nitrogen-purged, 250 ml flask. 2.932 liters of a solution, in diethyl ether, of magnesium benzyl chloride (prepared by the reaction of 53.5 gm of magnesium turnings with 232 ml of benzyl chloride) were cooled to −20° C and stirred, and 126 gm of zirconium tetrachloride were added from the 250 ml flask over a period of 30–45 minutes, the addition being effected via a flexible nitrogen purged connector. The reaction temperature was held between −15° and −10° C during the addition and light was excluded by shrouding the reaction vessel in aluminium foil. The cold bath was left in place, while the reaction mixture worked up to 0° C and was then removed. The reaction mixture was stored overnight at ambient temperature.

The ethereal solution of zirconium tetrabenzyl was separated from $ZrCl_4$ and precipitated $MgCl_2$ by filtration through ~20 gms of Ketjen Grade B alumina (previously dried for 2 hours at 500° C) on a G3/G4 sinter. A further 1 liter of dry ether was added to the reaction vessel residues and, after stirring for 30 minutes, filtered through the same sinter. The combined filtrates were then concentrated under vacuum to about half the original volume, when orange crystals of zirconium tetrabenzyl separated out. The crystals and mother liquor were left overnight at −20° C.

Following decantation of the ethereal mother liquor, the crystals were pumped dry (~1 hr) before being dissolved in hexane by contacting the crystals, three times with one liter of boiling hexane each time, each period of contacting being for 1 hour. Using nitrogen pressure, the hot hexane solutions were forced rapidly through a G2 sinter holding ~10 gms of Ketjen Grade B alumina previously dried for 2 hrs at 500° C. On cooling, crystals of zirconium tetrabenzyl separated out from the filtrate which was again left overnight at −20° C to complete crystallisation.

The hexane was then decanted off and the crystals pumped dry before dissolving in 500 mls of dry, deoxygenated toluene. At this point, examination by infrared spectroscopy was carried out to confirm the absence of residual ether (1120 cm$^{-1}$) and oxygenated products (1100 cm$^{-1}$). Finally, the solution was made up to 1 liter with toluene and analysed for zirconium, magnesium and chlorine. The molar ratio Zr/Mg (purity ratio) was found to be 4700/1.

Using this very pure material, a series of zirconium tetrabenzyl solutions of decreasing purity ratio were prepared by the addition of appropriate amounts of magnesium chloride.

A series of supported catalysts were prepared from these solutions, using the technique described above and were then used to copolymerise ethylene and hexene-1 using the general polymerisation procedure previously described. However, in these experiments, instead of butene-1, 125 ml of hexene-1 was added initially to the reactor and a further 30 ml added per hour during polymerisation. The catalyst loading was 0.5 mA Zr/g.

The results of polymerisation are summarised in Table 1, below. About 300 g of polymer was produced in each case.

Table 1

| Example | Purity Ratio (Zr/Mg) | MFI of Copolymer | Hexene Incorporation (Molar %) |
|---|---|---|---|
| 4 | 200 | 4.3 | 1.8 |
| 5 | 500 | 6.0 | 2.4 |
| 6 | 1000 | 4.1 | 2.9 |
| 7 | 4700 | 11.9 | 3.1 |
| Control | 50 | 0.72 | 1.8 |

These results were plotted on a graph (FIG. 1), from which it will be seen that a significant change in the degree of incorporation of co-monomer occurs at a purity ratio of about 500/1 and that once a purity ratio of about 1000/1 has been reached little further incorporation occurs with increase in purity ratio.

What we claim is:

1. A process for the copolymerization of ethylene with one or more other mono α-olefins in which the monomers are contacted with an initiator composition which is the product of reacting an organo-metallic compound of general formula $R_mMX_p$ with finely divided alumina which is free from adsorbed water, where M is a metal of Group IVA, R is a hydrocarbyl group, and X, when present, is a singly charged anionic ligand or a monodentate neutral ligand and m and p are integers, m having a value from 2 to 4 and n having a value from 0 to 2 the sum of m and p being not more than 4, is characterised in that the said organo-metallic compound has a purity ratio of at least 500/1, wherein said organometallic is prepared by reaction of a Group IV A metal halide with a Group I-III metal hydrocarbyl compound; wherein said purity ratio is defined as the molar ratio of the Group IV A metal to Group I to III metal in the Group IVA organometallic.

2. A process according to claim 1 in which the purity ratio of the organo-metallic compound is at least 1000/1.

3. A process according to claim 2, wherein said one or more other monoalpha-olefins is hexene-1.

4. A process according to claim 1 in which the mono α-olefin or olefins have from 3 to 10 carbon atoms.

5. A process according to claim 4 in which the mono α-olefin is butene-1 or hexene-1 or a mixture thereof.

6. A process according to claim 1 in which ethylene is copolymerised with from 0.1 to 3.0 molar % of one or more α-olefins.

7. A process according to claim 1 in which the organo-metallic compound is zirconium tetrabenzyl.

8. A process according to claim 1 in which the organo-metallic compound is purified by recrystallisation from a suitable hydrocarbon solvent.

9. A process according to claim 8 in which the organo-metallic compound is reacted partially with a little of the moisture-free alumina which it is intended to use as a support, before it is recrystallised.

10. A process according to claim 1, wherein R is alkyl, alkenyl, or substituted alkyls of the formula —$CH_2Y$, where Y is phenyl, p-methyl phenyl, naphthyl or $Z(R^1)_3$ where Z is silicon, germanium, tin or lead and $R^1$ is hydrocarbon or hydrogen.

11. A process according to claim 1, wherein said one or more other monoalpha-olefins is hexene-1.

* * * * *